US010434999B2

(12) United States Patent
Cadeddu (10) Patent No.: US 10,434,999 B2
(45) Date of Patent: Oct. 8, 2019

(54) STROKE CONTROLLED BALANCING DEVICE FOR A HYDRAULIC BRAKING SYSTEM, BRAKING SYSTEM COMPRISING THE DEVICE AND METHOD OF OPERATING THE BRAKING SYSTEM

(71) Applicant: VHIT S.p.A. Società Unipersonale, Offanengo (IT)

(72) Inventor: Leonardo Cadeddu, Crema (IT)

(73) Assignee: VHIT S.p.A. Società Unipersonale, Offanengo (IT)

( * ) Notice: Subject to any disclaimer, the term of this patent is extended or adjusted under 35 U.S.C. 154(b) by 0 days.

(21) Appl. No.: 15/745,627

(22) PCT Filed: Jul. 20, 2016

(86) PCT No.: PCT/IB2016/054314
§ 371 (c)(1),
(2) Date: Jan. 17, 2018

(87) PCT Pub. No.: WO2017/013595
PCT Pub. Date: Jan. 26, 2017

(65) Prior Publication Data
US 2018/0208167 A1    Jul. 26, 2018

(30) Foreign Application Priority Data
Jul. 21, 2015    (IT) .................... 102015000036663

(51) Int. Cl.
*B60T 11/10*    (2006.01)
*B60T 11/21*    (2006.01)
(Continued)

(52) U.S. Cl.
CPC .......... *B60T 11/101* (2013.01); *B60T 11/203* (2013.01); *B60T 11/21* (2013.01); *F16K 15/025* (2013.01);
(Continued)

(58) Field of Classification Search
CPC ...... B60T 11/21; B60T 11/101; B60T 11/108; B60T 11/203; B60T 2201/16;
(Continued)

(56) References Cited

U.S. PATENT DOCUMENTS

| 3,399,932 A |   | 9/1968 | Alfieri et al. |
| 4,006,593 A | * | 2/1977 | Edwards ................. B60T 11/21 60/581 |

(Continued)

FOREIGN PATENT DOCUMENTS

| EP | 1457400 A1 | 9/2004 |
| WO | 2009077190 A2 | 6/2009 |

(Continued)

OTHER PUBLICATIONS

International Search Report dated Dec. 8, 2016, of the corresponding International Application PCT/IB2016/054314 filed Jul. 20, 2016.

*Primary Examiner* — Pamela Rodriguez
(74) *Attorney, Agent, or Firm* — Norton Rose Fulbright US LLP; Gerard Messina (57) ABSTRACT

A stroke-controlled balancing device for hydraulic braking systems, comprising a balancing duct, a normally closed balancing valve, configured, in use, to maintain a connection between the hydraulic braking system and the balancing duct either closed or open, a stem having an external surface and an internal surface. A balancing channel is provided on the internal surface of the stem, said channel being hydraulically connected to the balancing duct, and the balancing valve is configured to slide, in use, along the external surface of the stem in order to open the connection between the braking system and the balancing duct. A braking system comprising the balancing device, as well as a method of operation of the braking system, are also described.

11 Claims, 7 Drawing Sheets

(51) Int. Cl.
  *B60T 11/20* (2006.01)
  *F16K 15/02* (2006.01)
  *F16K 15/04* (2006.01)
  *F16K 15/18* (2006.01)
  *B62D 11/08* (2006.01)

(52) U.S. Cl.
  CPC .......... *F16K 15/042* (2013.01); *F16K 15/183* (2013.01); *B60T 2201/16* (2013.01); *B62D 11/08* (2013.01)

(58) Field of Classification Search
  CPC ....... B62D 11/08; B62D 17/04; F16K 15/042; F16K 15/183; F16K 15/025
  USPC .......... 303/9.74, 2, 8, 9.91, 9.916; 188/345, 188/106 P, 354; 60/549, 591, 562, 581, 60/547.2
  See application file for complete search history.

(56) References Cited

U.S. PATENT DOCUMENTS

| | | | | |
|---|---|---|---|---|
| 4,178,757 | A | * | 12/1979 | Ketterling .............. B62D 11/08 60/548 |
| 4,408,805 | A | | 10/1983 | Edwards et al. |
| 2012/0111678 | A1 | * | 5/2012 | Alberti ................. B60T 11/101 188/345 |
| 2013/0175852 | A1 | * | 7/2013 | Cadeddu ................ B60T 11/21 303/8 |

FOREIGN PATENT DOCUMENTS

| | | |
|---|---|---|
| WO | 2012035498 A2 | 3/2012 |
| WO | 2012095767 A2 | 7/2012 |

\* cited by examiner

Fig. 7

STROKE CONTROLLED BALANCING DEVICE FOR A HYDRAULIC BRAKING SYSTEM, BRAKING SYSTEM COMPRISING THE DEVICE AND METHOD OF OPERATING THE BRAKING SYSTEM

FIELD

The present invention relates generally to a balancing device for hydraulic braking systems used, in particular, in agricultural vehicles, earth-moving machinery or similar vehicles.

More particularly, the present invention relates to stroke-controlled balancing devices mechanically controlled by the stroke of pistons in master cylinders of braking systems.

The present invention further relates to a method of operation of the system using the device.

BACKGROUND INFORMATION

Conventionally, within the field of agricultural vehicles and the like, hydraulic braking systems comprising two mutually coupled master cylinders are used.

In such braking systems two pedals are typically used for controlling braking of a right rear wheel and/or of a left rear wheel, respectively, by exerting corresponding braking pressures.

The two pedals can be actuated separately by an operator, thus causing steering of the vehicle and this mode of operation is referred to as "steer-braking" or "steer-by-braking function" (SBF)

The two pedals can be actuated simultaneously by an operator, thus causing simultaneous braking of at least both rear wheels of a vehicle. In this case, in order to ensure balanced braking, i.e., braking with substantially the same intensity on both rear wheels, it is provided to use devices for balancing braking pressures.

Balancing devices allow to balance the braking or control pressures exiting the two master cylinders, thus guaranteeing the same braking action on both rear wheels of the vehicle, if any different pressures and/or different volumes of hydraulic fluid or liquid exist in the two master cylinders, said differences being absorbed by the braking System (volumetric absorption of the system).

There are two conventional types of devices for balancing pressure between two master cylinders of a hydraulic braking system, namely "stroke-controlled" balancing devices and "pressure-controlled" balancing devices.

In "stroke-controlled" balancing devices, in general, the mechanism for balancing pressure is actuated mechanically when the pistons working in the master cylinder move over a predetermined initial stroke.

In "pressure-controlled" balancing devices, the balancing mechanism is controlled hydraulically by a certain pressure threshold reached by the liquid in the master cylinders, depending on the volumetric absorption of the system and independent of the stroke of the pistons working in the master cylinders.

European Patent Application No. EP1457400_A1 describes a "stroke-controlled" balancing device in which the master cylinders are in mutual communication through a balancing duct, the ends of which open into orifices formed in the master cylinders. The pistons working in the master cylinders, when they are in a rest Position, tightly seal, by means of sealing gaskets, the orifices of the cylinders, thus obstructing the passage between the balancing duct and the interior of the cylinders.

According to EP1457400_A1, it is provided that annular crowns connected to the interior of the cylinders by means of respective connecting holes are provided along the outer diameters of the pistons so that, when the operator acts on both pedals, the sliding of the pistons allows the balancing duct to communicate freely with the interior of the master cylinders through these connecting holes, this resulting in a balancing of pressures.

This kind of device, while having high reliability, usually has the problem of an excessive axial size.

In addition, the sealing gaskets present in the pistons must be capable of sliding within the master cylinders so as to allow the balancing duct to communicate with the master cylinders. This requirement makes it necessary for the pistons and master cylinders of the braking systems with "stroke-controlled" balancing to have a length greater than the length in the case of a system without balancing device.

For example, a stroke-balanced device like the one described in the cited prior art document requires a length of the pistons and master cylinders that is equal to the sum of the sliding length of the pistons and the length necessary for allowing sliding of the sealing gaskets present in the pistons in order to allow the balancing duct to communicate with the orifices in the master cylinders.

PCT Application No. WO2012035498_A2 describes a hydraulic device for Controlling braking in vehicles with two braking pedals.

In WO2012035498_A2, there is provided a pair of balancing valves associated each to one of the master cylinders and arranged to balance in a pressure-controlled manner the master cylinders by connecting them to each other through a balancing duct when the two pedals are actuated simultaneously.

In WO2012035498_A2, the balancing valves are provided in seats parallel to longitudinal axes of the master cylinders, whereby the axial size of such valves does not affect the axial size of the master cylinders and of the braking pistons, unlike what happens in those devices, such as the cited prior art device, in which a stroke-controlled balancing is provided.

The devices having valves with pressure-controlled balancing, however, especially in boosted devices with so called "pre-filling functions", present some problems arising from the fact that actual braking systems do not always have optimal operation conditions, whereby an increase in the pressures in the master cylinders depends on the Volumetric absorption of each braking device, which absorption may change as a consequence of tolerances, wear and purging quality.

In addition, pressure-controlled balancing valves may have different calibration conditions or different operating conditions so as to make it difficult to obtain an effective balancing of braking, such as when, in case of a prolonged use of only either one of the rear brakes, the operator shifts to braking with both brakes.

On one hand, braking devices with stroke-controlled balancing have the problem of involving an axial size greater than the one required by braking devices with pressure-controlled balancing, and, on the other hand, braking devices with pressure-controlled balancing may present operating problems that are usually absent in braking devices with stroke-controlled balancing.

The problem of the axial size of braking devices with stroke-controlled balancing is quite relevant, in particular, in agricultural vehicles, in which there is an increasingly felt need to reduce the axial size of the devices installed on them.

SUMMARY

An object of the present invention is to provide a stroke-controlled balancing device for hydraulic braking systems which addresses the problems mentioned above.

According to the present invention, a stroke-controlled balancing device is provided.

The present invention further relates to a hydraulic braking systems comprising the stroke-controlled balancing device according to the present invention, as well as a method of Operation of the braking system.

The following brief description of the present invention is given in order to provide a basic understanding of some aspects of the present invention.

This brief description is not an extended description and as such it is not be intended as being suitable for identifying critical or key elements of the invention, or as being suitable for outlining the scope of the present invention. Its only purpose is to present some aspects of the present invention in a simplified form.

According to an aspect of an example embodiment of the present invention, the stroke-controlled balancing device for hydraulic braking systems with two master cylinders provides, for each master cylinder, a normally closed balancing valve arranged to slide along an outer surface of a stem having an inner cavity connected to a balancing duct of the braking system so as to open the balancing valve by means of a telescopic movement of the balancing valve relative to the stem.

According to a further aspect of an example embodiment, the balancing valve is integrally connected to a controlling rod of the braking system.

According to another aspect of an example embodiment, the stroke-controlled balancing system provides both a brake boosting function and a pre-filling function.

BRIEF DESCRIPTION OF THE DRAWINGS

These and other features and advantages of the present invention will become apparent form the following description of preferred embodiments given by way of non-limiting examples with the aid of the figures, in which components identified by the same reference numerals indicate components having a same or similar function and structure.

DETAILED DESCRIPTION OF EXAMPLE EMBODIMENTS

Figure 1:
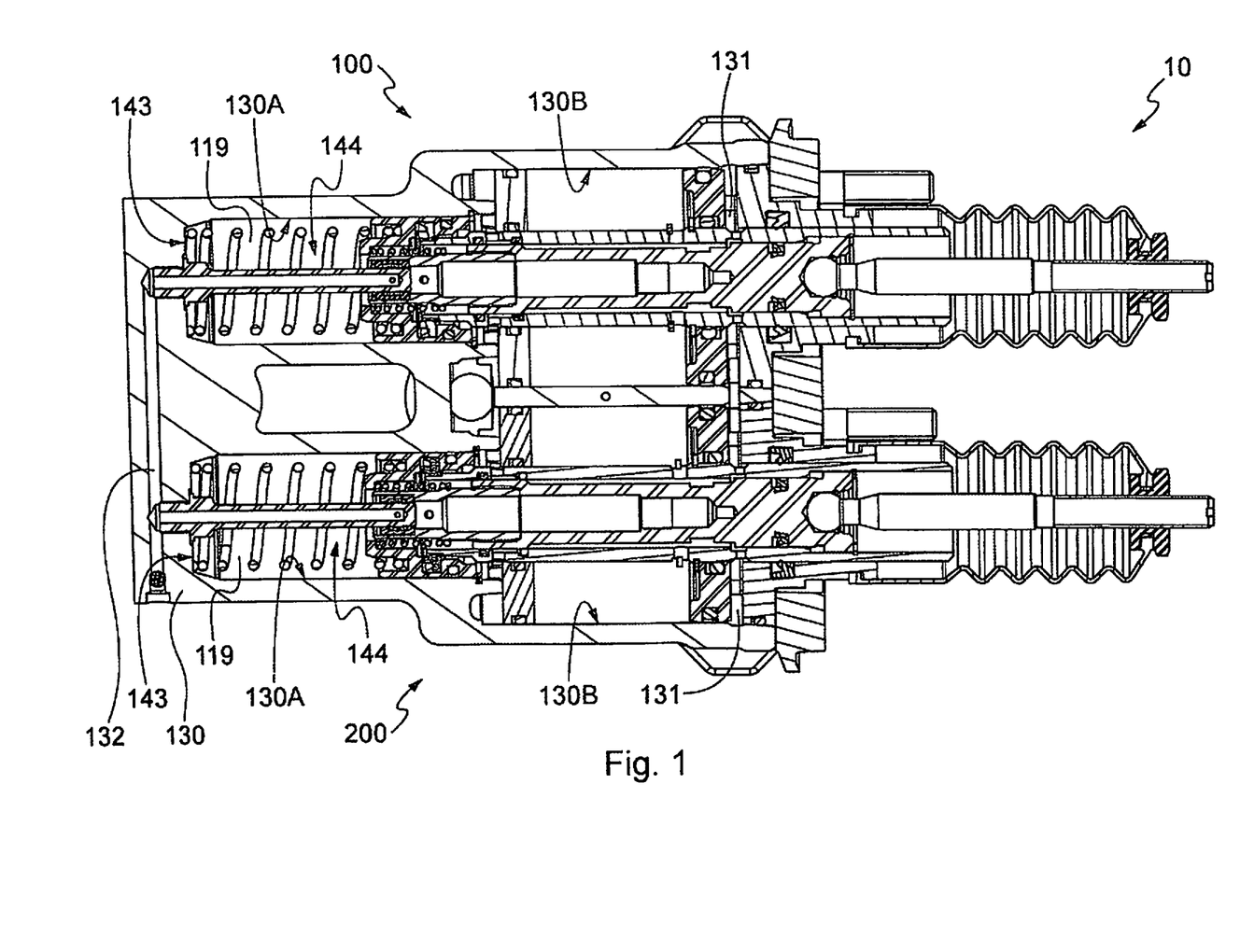
FIG. 1 shows a sectional view of a hydraulic braking system comprising pressure balancing systems, according to a first example embodiment of the present invention.

With reference to FIG. 1, a hydraulic braking system 10 (hereinafter, braking system) for an agricultural vehicle or the like, according to a first embodiment of the invention, comprises a first master cylinder 100 and a second master cylinder 200 that are actuated by means of respective pedals (not shown in the Figure) and provided, preferably, with brake boosting function.

Each of the two master cylinders 100, 200 is housed, for example, in a front axial bore 130A and in a rear axial bore 130B, wherein the term "front" refers to the left side of FIG. 1 and the term "rear" refers to the right side.

The front axial bore 130A and the rear axial bore 130B are obtained, for instance, in a single body 130. Although in the description and in the figures reference is made to master cylinders obtained in a single body, it is possible to provide that the master cylinders are housed in separate bodies.

Each of the two master cylinders comprise a rear chamber 131 in which pressurized oil flows from a positive displacement pump and/or from an accumulator arranged externally to the braking system 10, and a pressurizing chamber 119 having a front bottom 143. When the master cylinder is actuated by means of the respective pedal, the pressurizing chamber 119 intended to contain oil at a control pressure suitable for actuating external devices, preferably rear brakes of the agricultural vehicle.

The braking system 10 further comprises a balancing duct 132 which, through "stroke-controlled" balancing devices contained in the respective master cylinders, mutually connects the pressurizing chambers 119 of the two master cylinders.

The following description refers to the first master cylinder 100 of the braking system 10. As the two master cylinders preferably have identical structure and operation, this description applies also to the second master cylinder 200.

The first master cylinder 100 (hereinafter, master cylinder) comprises a bar 116 (FIG. 2) having an annular crown formed on the outer surface; the bar is connected, in a known manner, to a controlling rod 115 which in turn is connected to a respective pedal. The bar 116 is arranged to slide, with its outer surface, in a piston 120, which through a fixed disc 133 separates the front bore 130A from the rear bore 130B. A bushing 114 is connected in an integral manner, for example by screwing, to one end of the bar 116 distal relative to the controlling rod 115.

Figure 2:
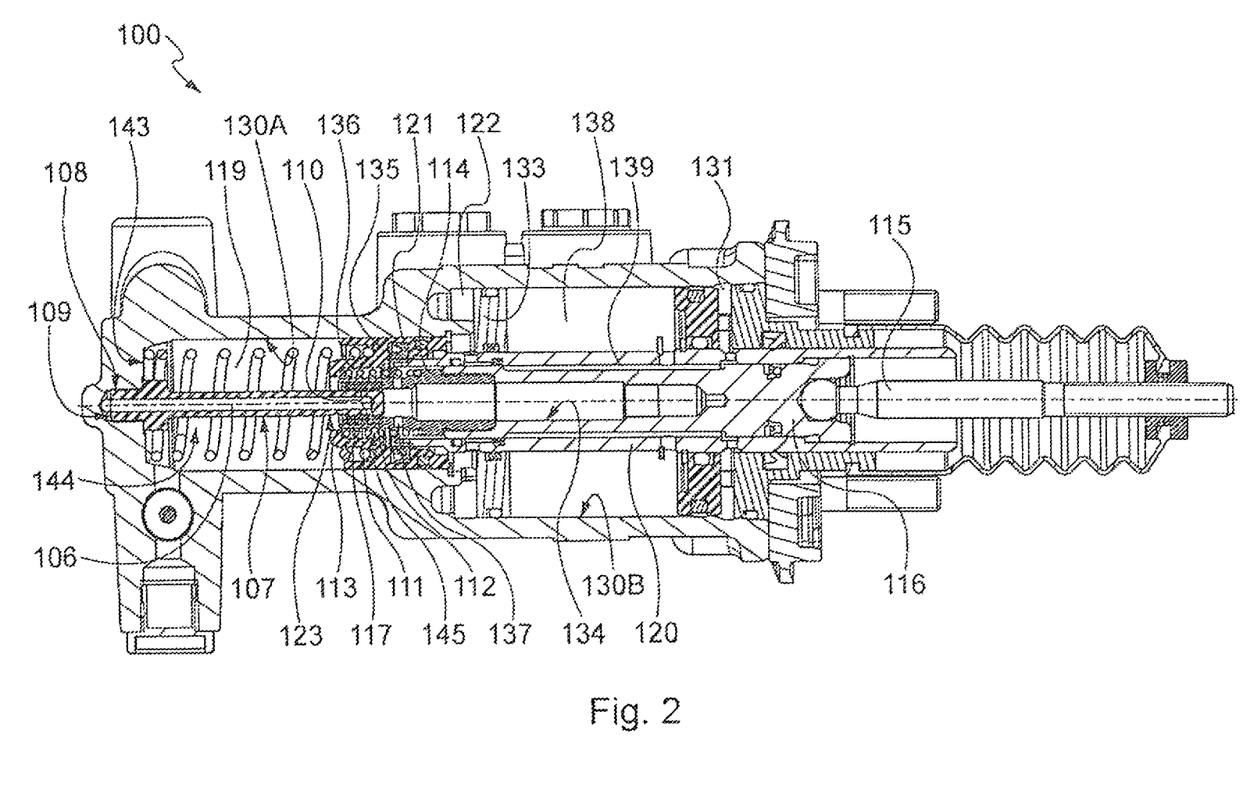
FIG. 2 shows a sectional view of a master cylinder in the braking system of FIG. 1.

The bar 116 and the bushing 114 comprise at their inside a cavity 134, preferably coaxial to the bar 116 and to the bushing 114, said cavity having a blind rear end and an open front end.

The bushing 114 is also associated, by means of a counteracting member 117, for example a spring, to a plunger 135 adapted to slide in the front bore 130A. Between the plunger 135 and the bushing 114 there is formed a passage 136 that, by communicating with at least one radial hole 137 formed in the bushing 114, is adapted to connect together the pressurizing chamber 119 and the cavity 134 provided in the bar 116 and the bushing 114.

A "stroke-controlled" balancing device 144 according to the invention is provided in a front portion of the master cylinder 100.

The balancing device 144, according to the present invention, comprises a stem 107 coaxial to the cavity 134 and fixed to the body 130 of the master cylinder 100, for instance screwed to a portion 108 thereof, at the front bottom 143 of the pressurizing chamber 119. The stem 107, coaxial to the bar 116, comprises an inner surface in which a balancing channel 106 and an outer surface are provided.

A first end of the balancing channel 106, proximal relative to the bottom 143 of the pressurizing chamber 119, is connected to the balancing channel 132 by means of hole 109.

A second end of the balancing channel 106 distal relative to the bottom of the pressurizing chamber 119 terminates with at least one radial hole 110, for example with two radial holes.

The radial holes 110, according to a preferred, though not exclusive, embodiment, are intercepted by a gasket 111 preferably fitted on a case 112 mounted in the bushing 114 and held radially, for example by means of a holding ring or seeger ring 113. Preferably, the case 112 is mounted in the bushing 114 with some clearance, both axially and radially. This allows the case 112 to have some freedom of movement when it interacts with the stem 107. In particular, the radial clearance allows to compensate for possible coaxiality tolerances between the bushing 114 and the stem 107, thus allowing the case 112 to become self-centered relative to the stem 107.

The assembly consisting of gasket 111, case 112, seeger ring 113 and bushing 114 is suitable for building a normally closed balancing valve 145 separating the balancing channel 106 from the cavity 134 and therefore being adapted to separate the balancing duct 132 from the cavity 134.

According to other example embodiments, the balancing valve 145 can also be an assembly of known components other than those suggested as preferable, while still attaining the purpose of separating the balancing duct 132 from the cavity 134.

According to the described example, which is considered as preferable, the balancing valve 145 opens when the bushing 114, as a consequence of the actuation of the brake pedal, and after overcoming the preload of the spring 117, moves towards the front portion of the master cylinder 100, so that the gasket 111, sliding along the stem 107, leaves the radial holes 110 free, thus opening the connection between the cavity 134 and the balancing channel 106 and therefore between the pressurizing chamber 119 and the balancing duct 132. The balancing between the control pressures existing in the pressurizing chambers 119 is therefore effected mechanically after a predetermined stroke of the bar 116, i.e. by the stroke of the respective pedal.

The stem 107 according to the present invention is adapted to slide further in the cavity 134 substantially over the entire stroke of the pedal towards the front portion of the master cylinder 100.

For the purposes of brake boosting, obtained in a conventional manner by means of brake booster devices, the rear axial bore 130B comprises the rear chamber 131 and a front chamber 138 connected, in rest condition of the master cylinder 100, to the rear chamber 131 for instance by means of an annular duct 139 formed on the outer surface of the bar 116. When the brake pedal is actuated, the rear chamber 131 and the front chamber 138 are isolated from each other, in a conventional manner, by the bar 116.

In the front bore 130A there is further provided a discharge chamber 122 which, in rest condition of the master cylinder 100, is isolated from the rear chamber 138. When the brake pedal is actuated, the front chamber 131 and the discharge chamber 122 are connected in a conventional manner for example by means of the annular duct 139 of the bar 116.

The plunger 135 comprises a primary seal 121 arranged to be intercepted by the piston 120 when this, as a consequence of brake boosting (especially of the difference in pressure between the rear chamber 131, at high pressure, and the front chamber 138, at lower pressure because it is in modulated communication with the discharge chamber 122), slides towards the front bore 130A of the master cylinder 100. This brings about the separation between the pressurizing chamber 119 and the discharge chamber 122.

The braking system of the first embodiment described so far, by virtue of the brake boosting function with which the master cylinders are provided, is also operative in the case when the positive displacement pump and/or the outer accumulator are not capable (for instance because of malfunctioning) of supplying pressurized oil to the braking system.

According to a variant of the braking system of the first example embodiment, it is provided that the master cylinders of the braking system do not possess the brake boosting function.

In addition, according to a further variant of the first example embodiment, there is provided that the bar 116 and the bushing 114 of the master cylinders are made as a single piece.

Figure 3:
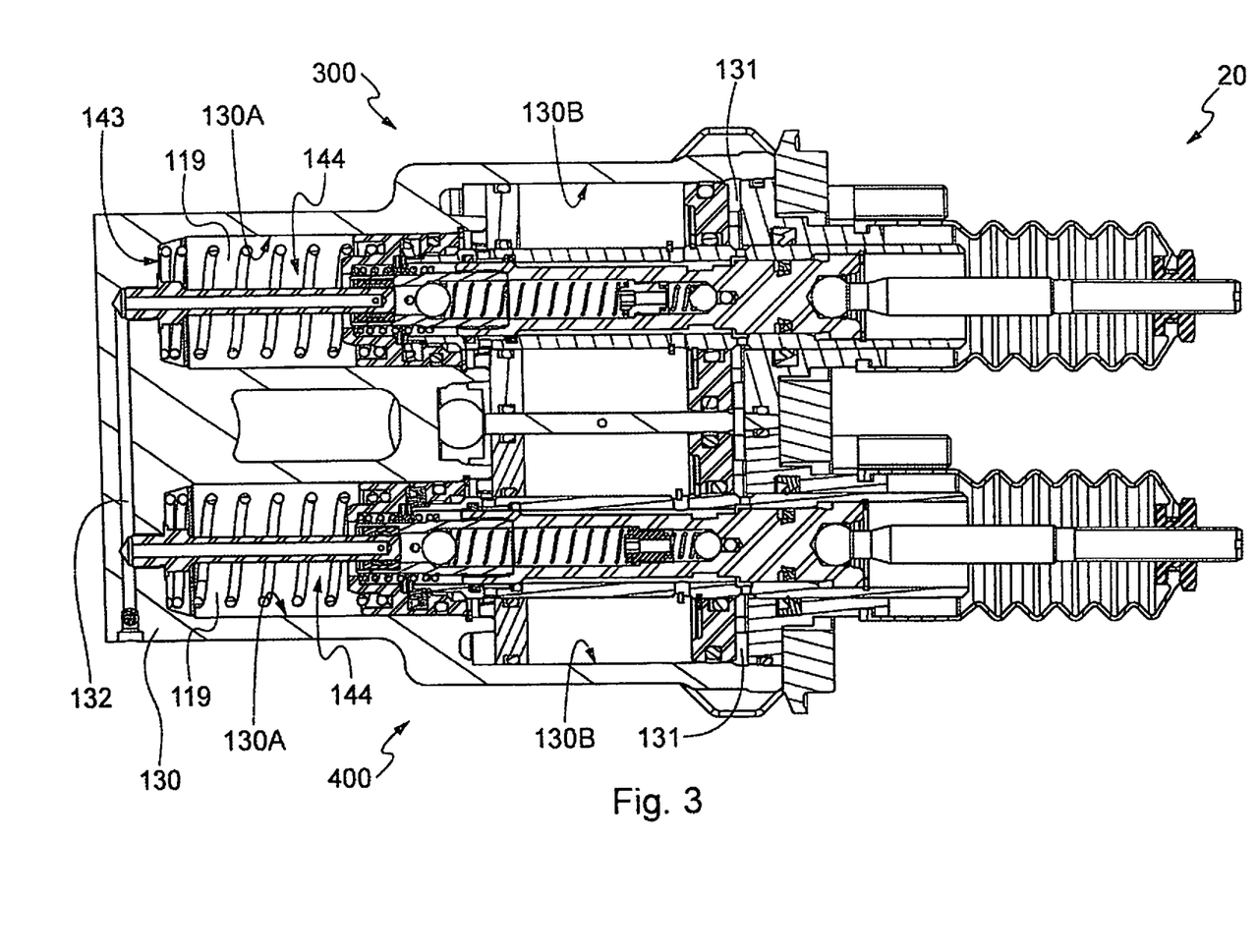
FIG. 3 shows a sectional view of a hydraulic braking system comprising pressure balancing systems, according to a second example embodiment of the present invention.

A second example embodiment of the braking system according to the present invention is shown in FIG. 3, in which components identical to the first embodiments have the same reference numerals.

The second embodiment differs from the first embodiment in that it provides for both a brake boosting function and a pre-filling function.

According to the second example embodiment, the braking system 20 comprises a first master cylinder 300 and a second master cylinder 400 (FIG. 3).

Each of the two master cylinders 300, 400 is housed, for instance, in a front axial bore 130A and in a read axial hole 130B.

The front axial hole 130A and the rear axial hole 130B are provided, for instance, in a single body 130. While in the description and in the figures reference is made to master cylinders provided in a single body, it is possible to provide that the master cylinders are housed in separate bodies.

According to the second example embodiment the cavity 134 (FIGS. 4 and 5), provided in the bar 116 and in the bushing 114, has a rear end communicating, through a radial hole 140, with a region outside the bar 116, in particular with an annular duct 139 formed on the outer surface of the bar 116 and therefore, when the master cylinder is in rest condition, with a rear chamber 131 in which pressurized oil flows from a positive displacement pump and/or from an accumulator arranged externally to the braking system 20.

Figure 4:
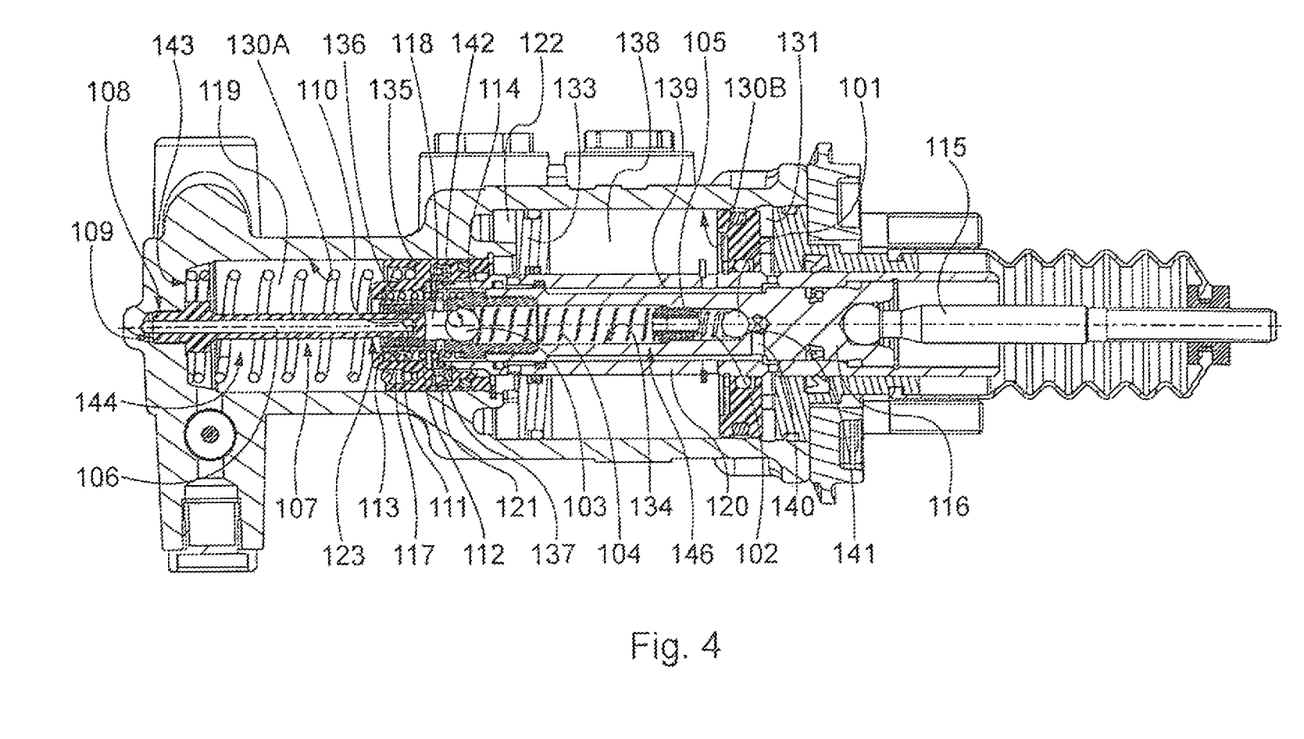
FIG. 4 shows a sectional view of a master cylinder in the braking system of FIG. 3.
Figure 5:
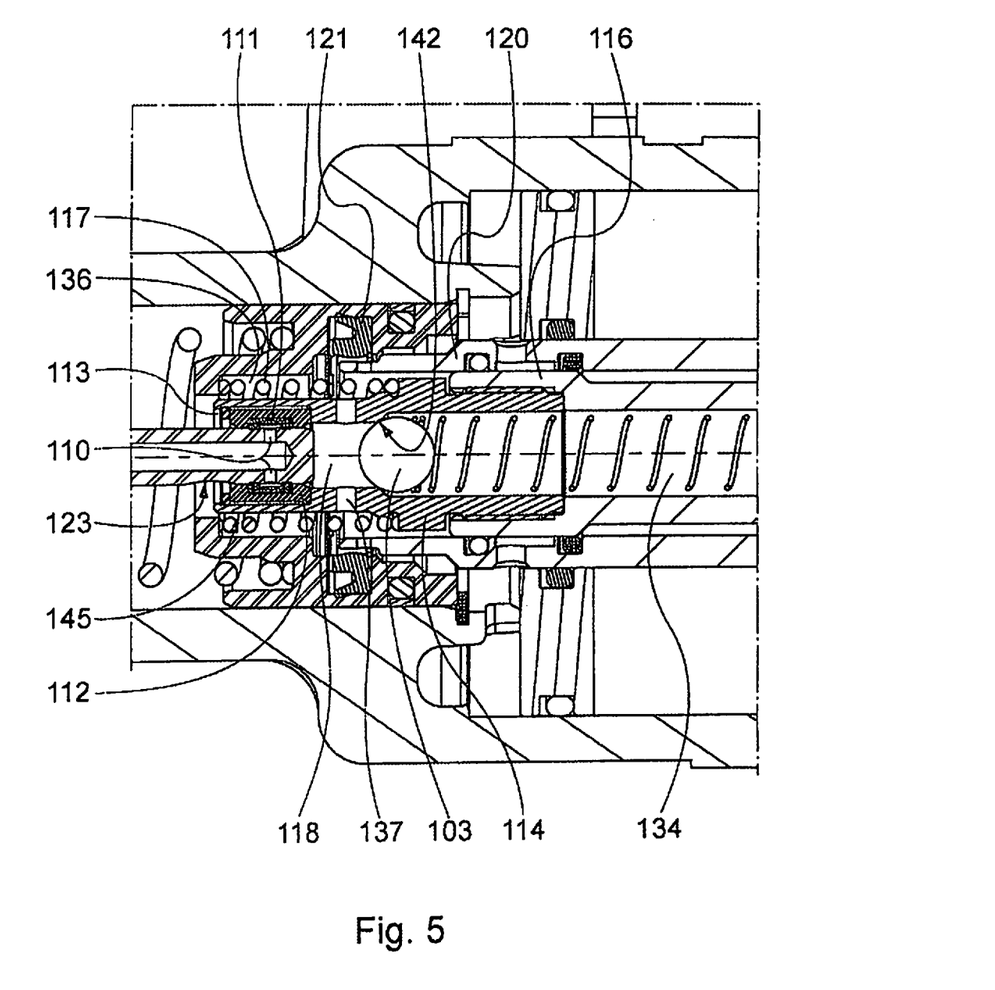
FIG. 5 shows an enlarged view of a portion of the master cylinder of FIG. 4.

Within the cavity there is provided a pre-filling device 146 comprising a first ball 101, a second ball 103, a hollow adjustable abutment element 105, located between the two balls, a first counteracting spring 102 arranged between the first ball 101 and the adjustable abutment element 105, and a second counteracting spring 104 arranged between the second ball 103 and the adjustable abutment element 105.

The first counteracting spring 102, lying against the adjustable abutment element 105, is configured to press the first ball 101 against a communication hole 141 between the radial hole 140 and the cavity 134, thus closing the passage between said radial hole 140 and said cavity 134, and to open said passage in the presence of a predetermined pressure difference between the radial hole 140 and the cavity 134.

The pressure in the cavity 134 at which the counteracting spring 104 is adapted to close said passage is called pre-filling pressure and is, for instance, comprised between 2 and 6 bar; the first counteracting spring 102 and the first ball 101 therefore act as a pressure reducer for the pressure upstream of the radial hole 134, i.e. in the chamber 138.

The second counteracting spring 104, lying against the adjustable abutment element 105, is configured to press the second ball 103 against an abutment element 142 provided in the cavity 134, in particular in the bushing 114, thus isolating, in rest condition, a portion of cavity (chamber 118) from the rest of the cavity 134.

In a variant of the second example embodiment, it is provided that no second counteracting spring 104 is used. In this case, the second ball 103 is pressed against the abutment element 142 by the flow of fluid entering from the radial hole 140, by the abutment element 141 and by the respective ball 101 pressed by the flow.

The bushing 114 is further associated, by means of a counteracting member 117, for example a spring, to a plunger 135 adapted to slide in a front axial bore 130A of the master cylinder 300. Between the plunger 135 and the bushing 114 there is provided a passage 136, which, communicating with at least one radial hole 137 formed in the bushing 114, is arranged to connect a pressurizing chamber 119 to the chamber 118 in the bushing 114.

A balancing device 144 identical to the one described with reference to the first example embodiment is provided in the front portion of the master cylinder 300.

The balancing device 144 therefore comprises a stem 107 enclosing a balancing channel 106 having a first end communicating with a balancing duct 132 and a second end comprising radial holes 110. The holes 110, in the same manner as described for the first embodiment, are intercepted by a gasket 111, preferably fitted on a case 112 mounted in the bushing 114 and held by means of a seeger ring 113, so as to build as a whole a normally closed valve separating the balancing channel 106 from the chamber 118.

The balancing valve 145 opens when the bushing 114, as a consequence of the actuation of the brake pedal (in the same manner as described with reference to the first embodiment), and after overcoming the preload of the spring 117, moves towards the front portion of the master cylinder 300, so that the gasket 111 leaves the radial holes 110 free, thus opening the connection between the balancing channel 106 and the chamber 118.

The stem 107 is arranged to slide further in the cavity 134, substantially over the entire stroke of the pedal (and therefore of the bar 116 and of the bushing 114) towards the front portion of the master cylinder 300. During such stroke, the second ball 103 contained in the cavity 134 comes into contact with a rear end of the stem 107. The stem 107 is therefore adapted to move the second ball 103 so that said ball moves away from the abutment element 142 and leaves the passage between the cavity 134 and the chamber 118 and therefore between the cavity 134 and the pressurizing chamber 119, free through the passage 136 and the radial hole 137 of the bushing 114.

The master cylinder 300 comprises components similar to those described with reference to the first embodiment and arranged to perform the brake boosting function.

Preferably, in all the example embodiments described so far, the stem 107 comprises a recess 123 on its outer surface, said recess having the purpose of venting, after a first portion of the stroke of the bushing 114 and of the bar 116, any pressure that may have accumulated in the valve 145, in particular in the gasket 111. This pressure accumulation occurs when the actuation of either of the cylinders is effected greatly in advance relative to the actuation of the other cylinder, or when the system remains inactive in the presence of a high increase in temperature.

Figure 6:
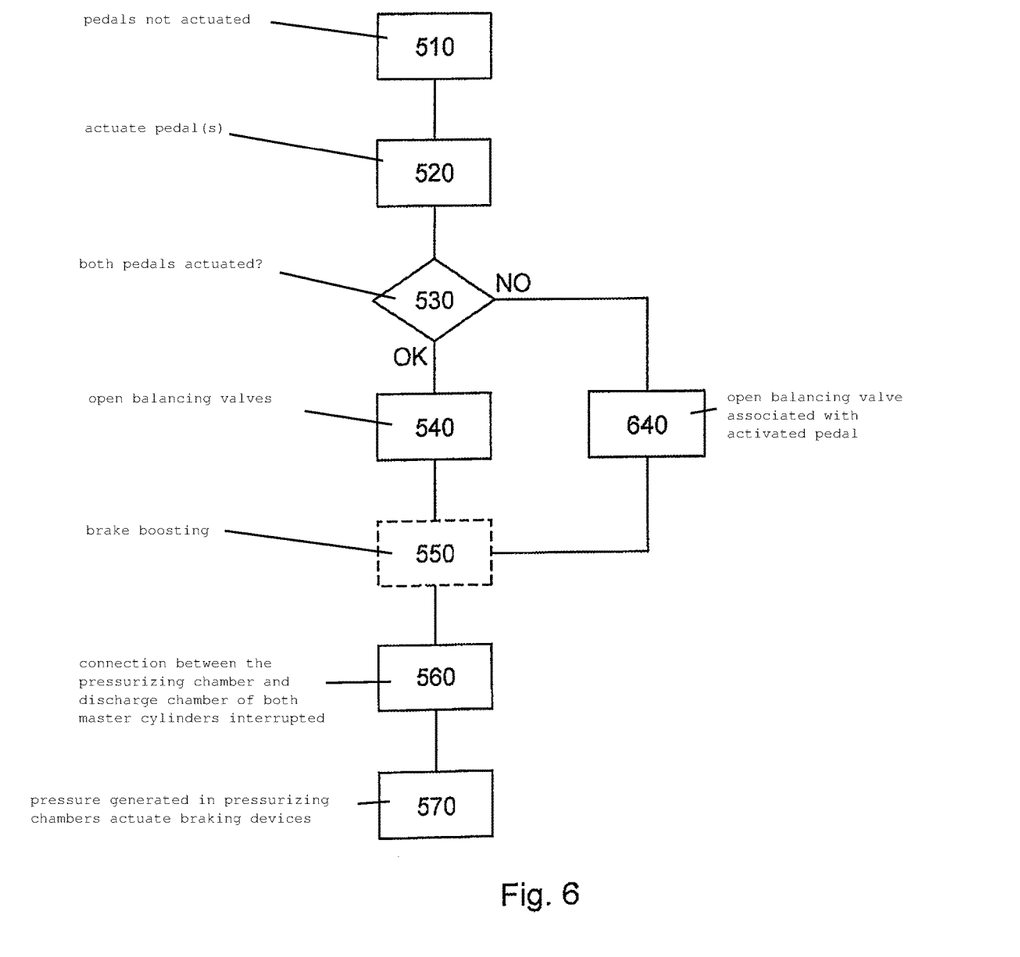
FIG. 6 shows a block diagram of the operation of the braking system according to the first example embodiment.

The operation of the braking system according to the first embodiment is the following (FIG. 6).

Step 510—In this step, the pedals associated to the respective master cylinders are not actuated. The master cylinders are therefore in a rest condition in which the respective balancing valves 110-114 are closed, preventing connection between the balancing channel 106 of the stem 107 of the balancing device 144 and the pressurizing chamber 119.

Step 520—In this step, the pedal associated to the bar of the first master cylinder 100 and/or the pedal associated to the bar of the second master cylinder 200 is actuated.

Step 530—If both pedals are actuated, the Operation proceeds to Steps 540-570, whereas if a single pedal is actuated, the Operation proceeds to Steps 640, 550-570.

In the case of braking with two pedals (balanced braking) the following steps are provided:

Step 540—In this step, as a consequence of the actuation of the pedals, the bar 116 and therefore the bushing 114 of both master cylinders 300, 400 slide towards a front region of the respective master cylinders so as to open the respective balancing valves of the balancing devices 144 and thus leave the passage between the cavities 134 and the balancing channels 106 free. The pressurizing chambers 119 of the master cylinders 100, 200 are therefore in communication with each other through the respective cavities 134, the respective balancing devices 144 and the balancing duct 132. A balancing of the control pressures of outer devices such as rear brakes of an agricultural vehicle is thus obtained.

Step 560—In this step, the connection between the pressurizing chamber 119 and the discharge chamber 122 of both master cylinders 100, 200 is interrupted.

Step 570—In this step, the pressure generated in the pressurizing chamber 119 of each of the two master cylinders 100, 200 actuates the respective braking device (usually the braking device of a right rear wheel and the braking device of a left rear wheel), thus allowing balanced braking, by possible transfer of fluid between the two chambers 119.

When the braking system 10 provides for the brake boosting function, an additional Step 550 is provided after Step 540 and before Step 560:

Step 550—In this step, brake boosting occurs and therefore, for each of the two master cylinders 100, 200, immediately after Step 540, the piston 120 receives a thrust towards the front portion of the respective master cylinder this is due to the opening of the modulated connection between the front chamber 138 and the discharge chamber 122 and the closing of the connection between the front chamber 138 and the rear chamber 131).

In the case of braking with one pedal only (steer-braking) the following steps are provided:

Step 640—In this step, as a consequence of the actuation of one pedal only, the balancing valve 145 of the master cylinder associated to such pedal is opened, whereas the balancing valve of the other master cylinder remains closed. Therefore, the pressurizing chambers 119 of the two master cylinders 100, 200 are not in mutual communication and there is no balancing of pressures.

The operation then proceeds to the possible Step 550 and to the Steps 560-570, applied only to the cylinder associated to the actuated pedal.

Figure 7:
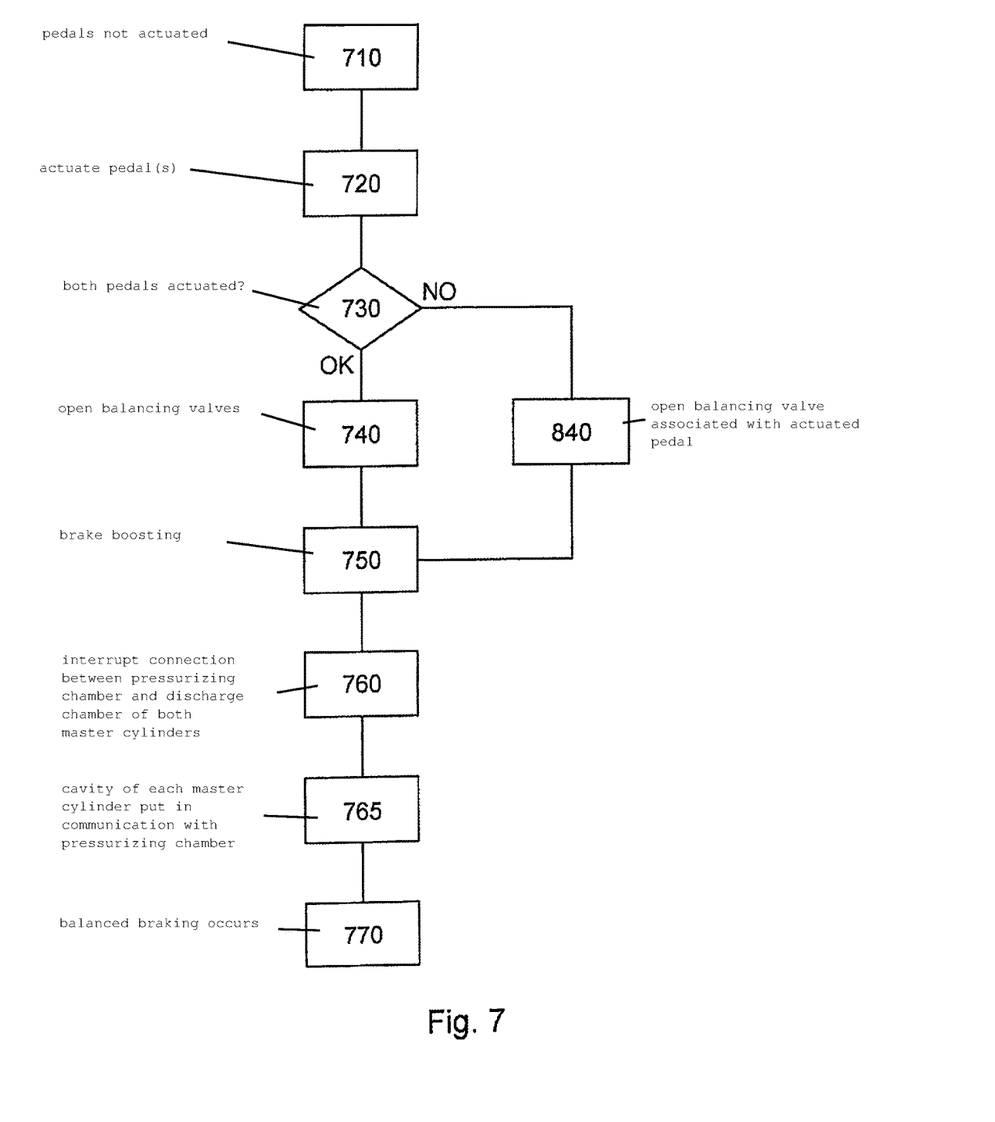
FIG. 7 shows a block diagram of the operation of the braking system according to the second example embodiment.

The Operation of the braking system according to the second embodiment is the following (FIG. 7).

Step 710—In this step the pedals associated to the respective master cylinders are not actuated. The master cylinders are therefore in a rest condition in which the respective balancing valves 110-114 are closed (in the same manner as illustrated in Step 510).

In addition, in this step, the rear chamber 131 and the cavity 134 are in communication with each other, because the ball 101 does not obstruct the radial channel 140, whereas the cavity 134 and the chamber 118 are separated by the second ball 103.

Step 720—In this step, the pedal associated to the bar of the first master cylinder 300 and/or the pedal associated to the bar of the second master cylinder 400 is actuated. Step 730—If both pedals are actuated, the operation proceeds to Steps 740-770, whereas if a single pedal is actuated, the operation proceeds to Steps 840, 750-770.

In the case of braking with two pedals (balanced braking) the following steps are provided:

Step 740—In this step (analogously to what happens in Step 540), the balancing valves of the balancing devices 144 are opened, thus leaving the passage between the cavities 134 and the balancing channels 106 free. The pressurizing chambers 119 are therefore in communication with each other and a balancing of the control pressures of outer devices such as rear brakes of an agricultural vehicle is obtained.

In addition, in this step, the ball 103 still obstructs the connection between the chamber 118 and the cavity 134.

Step 750—In this step, brake boosting occurs and therefore, for each of the two master cylinders 300, 400, the piston 120 receives a thrust towards the front portion of the respective master cylinder (with the same mechanisms as those described in Step 550).

Step 760—In this step, the connection between the pressurizing chamber 119 and the discharge chamber 122 of both master cylinders 300,400 is interrupted. In addition, the ball 103 still obstructs the connection between the chamber 118 and the cavity 134.

Step 765—In this step, in each of the two master cylinders 300, 400, the cavity 134 is put into communication with the chamber 118 and therefore with the pressurizing chamber 119. This takes place because the rear end of the stem 107, during movement of the bar 116 and the bushing 114 towards the front portion of master cylinder, comes into contact with the second ball 103 and presses it away from the abutment element 142.

This step 765 (pre-filling step) allows to open an oil flow from the chamber 138 to the cavity 134, and therefore to the pressurizing chamber 119; this flows continues thanks to the opening of the ball 103, which, by lowering the pressure in the chamber 134, causes opening of the ball 101, counteracted by the spring 102, thus maintaining the flow, which will end upon reaching the so-called pre-filling pressure, which will depend on the calibration of the spring 102 (for example comprised between 2 and 6 bar). Such flow, advantageously, is suitable for reducing clearances between the discs of the brakes controlled by the braking system, thus reducing the stroke of the brake pedals and consequently improving the braking feeling.

Step 770—In this step balanced braking (steer-braking) occurs (analogously to Step 570).

In the case of braking with one pedal only (steer-braking) the following steps are provided:

Step 840—In this step, as a consequence of the actuation of one pedal only, the balancing valve of the master cylinder associated to such pedal is opened, whereas the balancing valve of the other master cylinder remains closed. Therefore, the pressurizing chambers 119 of the two master cylinders 300,400 are not in mutual communication and there is no balancing of pressures.

The operation then proceeds to the Steps 750-770, applied only to the cylinder associated to the actuated pedal.

The example braking system of the present invention öfters several advantages.

A first advantage is the reduction of the axial size in comparison with braking systems equipped with stroke-controlled balancing devices of known type, thanks to the provision of the balancing device, which is capable of inserting itself, during the stroke of the bar 116, into an inner cavity of said bar.

In particular, a reduction of about 35 mm in the axial size of the master cylinders according to the present invention in comparison with a conventional master cylinder with stroke-controlled balancing device (EP1457400_A1) (such distance corresponds to the stroke of the pistons in the rear bore of the master cylinder).

The solution adopted for the balancing device reduces the axial size of the master cylinder and makes the axial size of the master cylinder equal to the axial size of a master cylinder provided with pressure-controlled balancing device (WO2012035498_A2). With respect to such known master cylinder, the master cylinder according to the present invention has a reduced axial size (due to the fact that the balancing device is arranged in the pressurizing chamber).

In addition, the braking device according to the present invention performs the balancing function in a manner compatible with the pre-filling function, because the balancing function is performed before the pre-filling function (contrary to what happens in braking systems with pressure-controlled balancing device and pre-filling function). This allows to prevent unbalances between the control pressures supplied by the two master cylinders of the braking system.

The invention claimed is:

1. A stroke-controlled balancing device for hydraulic braking systems, comprising:
   a balancing duct;
   a normally closed balancing valve, configured, in use, to maintain a connection between the hydraulic braking system and the balancing duct either closed or open; and
   a stem having an external surface and an internal surface, a balancing channel being provided on the internal surface, the balancing channel being configured to contain brake fluid and being hydraulically connected to the balancing duct;
   wherein the balancing valve includes a gasket, a case, and a bushing, the gasket being fitted on the case and being configured to slide, in use, along the external surface of the stem in order to open the connection between the braking system and the balancing duct.

2. The balancing device according to claim 1, wherein the stem includes at least one radial bore configured to connect the balancing channel to the braking system, the gasket being configured to intercept the at least one radial bore when the balancing valve is closed.

3. The balancing device according claim 1, wherein the bushing is connectable to a controlling rod of the hydraulic braking system.

4. The balancing device according to claim 1, wherein the case is mounted with clearance in the bushing.

5. The balancing device according to claim 1, wherein the stem includes a recess on the external surface, the recess being configured to vent pressure that may have accumulated in the valve.

6. A hydraulic braking system, comprising:
a first master cylinder and a second master cylinder, both of the first master cylinder and the second master cylinder having a closed bottom;
a first bar and a second bar configured to slide, in use, inside the first master cylinder and the second master cylinder, respectively, in to control respective braking devices;
wherein each of the first master cylinder and the second master cylinder includes a respective balancing device, each respective balancing device including a balancing duct, a normally closed balancing valve, configured, in use, to maintain a connection between the hydraulic braking system and the balancing duct either closed or open, and a stem having an external surface and an internal surface, a balancing channel being provided on each internal surface, each balancing channel being configured to contain brake fluid and being hydraulically connected to each balancing duct, wherein each balancing valve includes a gasket, a case, and a bushing, each gasket being fitted on each case and being configured to slide, in use, along the external surface of each stem in order to open the connection between the braking system and each balancing duct; and
wherein the stem of each balancing device is fixed to the closed bottom of each of the first and second master cylinders.

7. The braking system according to claim 6, wherein the normally closed valve of each balancing device is connected to the first and second bars.

8. The hydraulic braking system according to claim 6, further comprising:
respective cavities inside the first and second bars, each of the cavities having a first end connected to a respective brake booster device, and a second end in communication with the respective braking device, each of the cavities having at its inside, a first ball and a second ball, an adjustable abutment element between the first and second ball, and a first counteracting spring arranged between the first ball and the adjustable abutment element and configured to press the first ball tightly against the first end of the cavity, the second ball being configured to be moved by each stem to connect the cavity to the respective braking device and to perform a pre-filling function.

9. The hydraulic braking system according to claim 8, further comprising:
a second counteracting spring contained within each respective cavity between each second ball and each adjustable abutment element.

10. A method of operating a braking system having a first master cylinder and a second master cylinder, a first bar and a second bar configured to slide, in use, inside the first and the second master cylinders, respectively, to control respective braking devices, respective normally closed balancing valves, connected to the first and second bars, and respective stems of the master cylinders, the stems having an external and an internal surface, a balancing channel being provided on each internal surface, each balancing channel being hydraulically connected to a balancing duct, the method comprising:
separately actuating both the first and the second bars;
making the first and the second bars and the valves slide along the external surfaces of the stems, opening the balancing valves through actuation of the first and second bars, and connecting the master cylinders to each balancing duct through the balancing channels, to balance the braking system in a stroke-controlled manner; and
controlling the braking of the braking devices after balancing of the braking system.

11. The method according to claim 10, wherein after the stroke-controlled balancing step, effecting a pre-filling operation by means of a pre-filling device provided within each of the first and second bars and actuated by the stems through sliding of each of the first and second bars.

* * * * *